United States Patent [19]
Gross

[11] 3,767,288
[45] Oct. 23, 1973

[54] DEVICE FOR ILLUMINATING THE TRAVELING PATH OF A VEHICLE AND PROTECTING THE DRIVER FROM DAZZLING

[75] Inventor: Daniel Gross, Carouge, Geneva, Switzerland

[73] Assignee: Battelle Memorial Institute, Carouge/Geneve, Switzerland

[22] Filed: Dec. 1, 1971

[21] Appl. No.: 203,784

[30] Foreign Application Priority Data
Dec. 10, 1970 Switzerland.................. 18578/70

[52] U.S. Cl............. 350/156, 240/9.5, 240/46.57, 350/164, 350/276 R
[51] Int. Cl......................... G02b 5/28, G02b 27/28
[58] Field of Search............... 350/276, 156, 164; 240/9.5, 46.57, 46.59

[56] References Cited
UNITED STATES PATENTS
1,786,518  12/1930  Chambers.................. 350/276 R
2,927,245  3/1960  Irland et al................ 350/276 R UX
2,102,632  12/1937  Land........................ 350/276 R X
2,887,566  5/1959  Marks...................... 350/276 R UX Primary Examiner—John K. Corbin
Attorney—Karl F. Ross

[57] ABSTRACT

A device for illuminating the travelling path of a vehicle and protecting the driver thereof from dazzling by opposed source of light, comprising at least one headlight with a source of light formed by a linear light radiator whose light emission is limited mainly to certain spectral lines distributed over the visible range, and an optical filter adapted to the light emission of the linear radiator and arranged between the travelling path of the vehicle and the driver thereof, the optical filter being penetrable by the light coming from said headlight and being impenetrable by light of other wavelengths.

19 Claims, 9 Drawing Figures

Patented Oct. 23, 1973 3,767,288

DEVICE FOR ILLUMINATING THE TRAVELING PATH OF A VEHICLE AND PROTECTING THE DRIVER FROM DAZZLING

FIELD OF THE INVENTION

This invention relates to a device for illuminating the travelling path of a vehicle and protecting the driver from dazzling by opposed sources of light.

BACKGROUND OF THE INVENTION

An important factor in ensuring safety for road traffic consists in providing appropriate light conditions at night so that all colours essential for traffic can be recognized. To take account of the many repeated instances of drivers being dazzled by the light of oncoming vehicles as well as inappropriate stationary sources of light and the like, travelling speeds have to be reduced to not more than 70 km/h with dimmed lights ("low" beam) and not more than 110 km/h for the country high beam. However, such speeds which permit a vehicle to be stopped within the limits defined by the beam of the headlights are far below the values admissible with daylight. This applies particularly to motor-cars of the medium and higher price classes which often permit speeds of up to 150–200 km/h and therefore necessitate headlights and anti-dazzle devices permitting greater ranges of vision than those which could hitherto be obtained.

In spite of insufficient vision at night many drivers are going much too fast when they are outside of the towns. Such driving which is contrary to all rules of traffic and safety regulations frequently leads to major accidents. The rate of accident, which at night is about twice the rate of accidents occurring in daytime, in spite of less traffic, clearly indicates the increased risk for all people of the roads. Experience has shown that most of the accidents are caused by an insufficient range of vision and excessive fatigue or irritation drivers due to repeated dazzling. Thus there has been for many years an ever increasing necessity of solving the problems of protection from dazzling simultaneously with ensuring sufficient road illumination.

To solve this problem it has already been proposed to provide motor vehicles with headlights emitting polarized light and with polarization filters which permit the light reflected from the roadway to pass but filter away the light from the headlights of oncoming vehicles equipped in the same manner. It is obvious that this solution can only result in effective protection from dazzling if the vast majority of all vehicles in use are equipped from a given date with such a polarization system. However, such general introduction of a polarization anti-dazzle system is difficult to achieve for obvious legal as well as organizational reasons.

Also spectacles have it proposed which are provided with colored or polarization filters to protect against dazzling. These spectacles reduce all light flux passing to the driver's eyes without any selectivity of the reduction with respect to different sources of light. A serious disadvantage of this non selective light reduction is that is leads to a reduction of the power of vision of the driver wearing such spectacles since, with low illumination densities in the road portion to be observed, the sharpness of the observed objects also diminishes.

Special spectacles having glasses provided with reflecting areas are also known. They have the disadvantage of abstracting permanently from sufficient observation certain areas of the field of observation.

Also a system has been proposed in which the light projected by the headlights is reduced by dispersion of a small spectral region by automatically introduced monochromatic filters arranged, on the one hand, in front of the headlights which are equipped with a unilinear source of light and, on the other hand, in front of the eyes of the driver. However, this sytem does not comply with road safety regulations because by monochromatic filtering away of a single line only one color can be recognized and thus traffic signals such as traffic-lights and road signs etc. cannot be identified.

Each time when two vehicles pass one another and the filters are turned in both the driver whose vehicle is equipped with this system and the driver who is coming from the opposite direction must adapt himself to the new travelling conditions and this causes confusion and irritation to both drivers. In addition, when the filters are brought into play by photoelectric means, this means may be actuated unnecessarily by stationary sources of light. Therefore, such a system does not meet the psychological requirements of recognition of the various driving conditions.

To further reduce the risk of accidents at night sufficient stationary road illumination must be provided and this is at present being done with good results but only for relatively short road sections. For economic reasons it is not possible to envisage for a considerable time to come that an entire network of roads or at least the main thoroughfares will be quipped with sufficient stationary lights.

Gas discharge lamps have acquired great importance recently also for stationary street lamps because they provide a lighting power which is several times (e.g., four times) as high as that of incandescent lamps. Gas-discharge lamps are known with various atmospheres, lamps using Hg or Na vapors being frequently employed.

Often such metal vapor lamps are provided with various additional materials to further improve the lighting power or color reproduction. Such lamps are linear radiators which irradiate almost their entire light output in certain narrow wavelength bands, i.e., in characteristic spectral lines. When such gas discharge lamps are used in the high pressure range (working pressure 0.1 to 10 atm.) an illumination density comparable with that of incandescent tungsten lamps is obtained. The lighting power emitted in the spectral lines diffused in pressure and temperature in this case is always greater than the continuous radiation which is emitted simultaneously and is only slightly dependent on wavelength.

Because of the above-mentioned advantages gas-dishcarge lamps permit the construction of self-contained compact projectors with high light intensity and power and are used at present for film studios and military purposes. Their use for motor vehicle headlights on principle is also feasible but does not justify the cost as long as they do not provide further significant advantages.

OBJECT OF THE INVENTION

In view of the problems outlined above it is the object of the present invention to provide a device for illuminating the travelling path of a vehicle and efficiently protecting the driver from dazzling.

SUMMARY OF THE INVENTION

This device according to the invention comprises at least one headlight having a source of light in the form of a linear irradiator whose light output is mainly limited to certain spectral lines distributed over the visible range, and an optical filter adapted to the light-emission spectrum of the linear irradiator and arranged between the travelling path of a vehicle and the driver thereof, said optical filter being penetrable by the light coming from said headlight (i.e., light-permeable to the spectral lines of the light source) and being impenetrable by the light of other wave-lenths.

DESCRIPTION OF THE DRAWING

Two embodiments of the invention and a modification to the first embodiment will now be described with reference to the accompanying drawing, in which.

SPECIFIC DESCRIPTION

Figure 1:
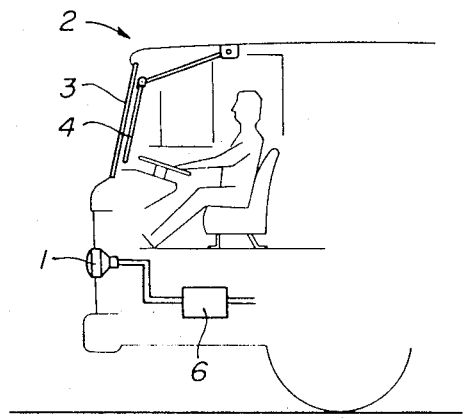
FIG. 1 is a schematic side-elevational view of the first embodiment of the invention mounted in a vehicle.
Figure 2:
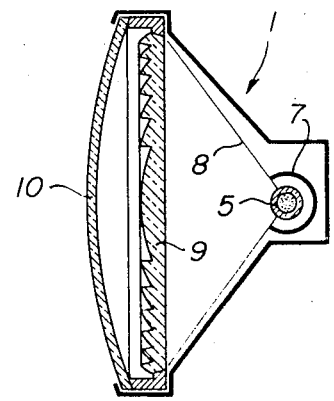
FIG. 2 is a detail view of FIG. 1 on a larger scale showing the light source in axial section.
Figure 3:
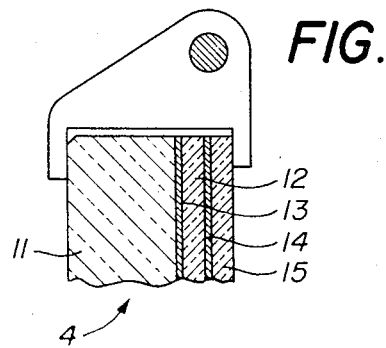
FIG. 3 shows a further detail of a portion of the system of FIG. 1 on a larger scale.

According to the first embodiment shown in FIGS. 1 to 3, the device comprises a pair of headlights 1 (one shown) secured in a conventional manner to a motor vehicle 2 shown only in part and an optical filter 4 arranged behind a wind-screen 3 of the motor vehicle 2. The optical filter 4 serves to protect the driver of the motor vehicle from dazzling by opposed sources of light and particularly by the light of oncoming vehicles equipped with conventional headlights.

The headlight 1 shown in cross section in FIG. 2 is provided with a gas discharge lamp 5 as a source of light in the form of a polychromatic linear irradiator. The headlight 1 is further provided with a counter-reflector 7 arranged coaxially to the lamp 5 to form a cone of light 8. The radius of this reflector may be, for example, from 5 to 10 mm. and its length 20mm. The headlight 1 further has a fresnel lens 9 to focus the cone of light 8. On its front side the headlight 1 is closed by a protection and diffusion glass window 10. The fresnel lens may have a focal length of about 10 cm. and is so arranged that the lamp 5 is located in its focal point. According to the various practical applications the diffusion glass 10 is further in a conventional manner so arranged that the distribution of light in the useful angle of diffusion of the headlight 1 will meet the practical requirements of the respective vehicle.

The headlight 1 may be switched over from the country beam to the traffic beam and vice versa by shifting the lamp 5 and the counter-reflector 7 in the focal plane of the fresnel lens 9. In so doing the coma or focal error of the fresnel lens 9 may produce a spreading of the beam of light downwardly below the illumination limit between dark and light.

The lamp 5 in the form of a polychromatic linear irradiator irradiates visible light in three spectral lines (blue, green and orange) and may be, for example, a Hg-Ar gas discharge lamp with admixtures of InI, TlI and NaI, the partial pressures of the dissociated metal vapors being in the upper millitorr range. Headlights with such a gas discharge lamp as the source of light emit visible light mainly in the three wave lengths:

$\lambda_1 = 451$ nm (blue, InI)
$\lambda_2 = 535$ nm (green, TlI)
$\lambda_3 = 589$ nm (orange, NaI)

The visible emission of mercury is almost completely eliminated while emission in the ultraviolet range is absorbed by the protection and diffusion glass 10.

With a discharge gap of 25 mm. and a diameter of 10 mm. this gas discharge lamp 5 may provide, for example, a power of 40 watts with a useful light yield of 50 lumen/watts when it is operated with a voltage of 80 volts.

FIG. 3 shows in cross section the upper portion of the optical filter 4 which is mounted on the rear side of a support plate 11. The filter 4 is an interference line filter of a higher order of the conventional Geffcken type and is formed of a transparent interference layer 12, for example, of $MgF_2$, arranged between two partially light permeable reflector layers 13 and 14 of silver. The layers 13, 12 and 14 may be applied successively in a known manner to the support plate 11 by evaporation. Finally, the layer 14 is provided with a transparent protective layer 15, for example, of $SiO_2$.

The light transmittance of the filter 4 is so adapted to the light emission of the gas discharge lamp 5 that the filter is permeable to the three mentioned emission wave length of $\lambda_1$, $\lambda_2$ and $\lambda_3$ and is essentially impermeable to other wave length. To ensure this adaption the required thickness of the interference layer 12 may be calculated by the known interference theory.

The tiltable mounting of the filter 4 illustrated in FIG. 1 permits it to be removed from the driver's field of vision in the case of dim daylight, dusk, etc., since under such conditions no protection from dazzling is required. However, the filter may also be applied directly to the wind-screen. In this case the wind-screen may be utilized, if desired, as a substrate for the filter 4 instead of the support plate 11.

Through the optical filter 4 of the driver of the vehicle equipped with the described device thus sees the light emitted by his own headlights 1 with the emission wave lengths $\lambda_1$, $\lambda_2$, $\lambda_3$, in a substantially unsubdued form whereas the light coming from external sources, particularly from oncoming vehicles equipped in a conventional manner, is almost completely blacked by the filter 4. In other words, the combination of the headlights 1 in the particular construction as three-line irradiators with the optical filter 4 adapted thereto affords the driver of the vehicle equipped in this manner a selective protection from dazzling by conventional sources of light while simultaneously ensuring an efficient illumination and good vision of his travelling path.

Figure 4:
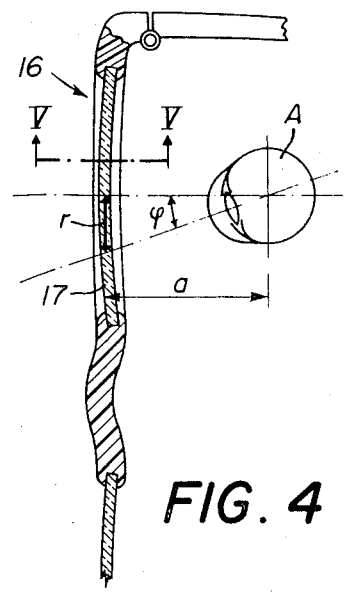
FIG. 4 shows schematically a portion of a pair of filtering spectacles according to a modification of the first embodiment.

According to a modification of the described device similar headlights as those described in FIGS. 1 and 2 are mounted on the motor vehicle whereas the optical filter is in the form of filter spectacles 16 (see FIG. 4). These spectacles are intended to protect the driver and, as shown in FIG. 5, are also of a different construction than the filter 4 described with reference to FIG. 3.

Figure 5:
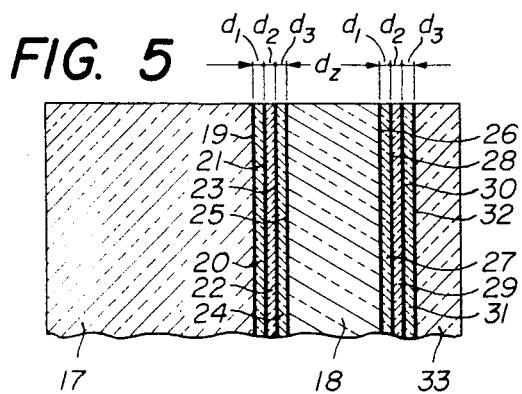
FIG. 5 shows a detail of FIG. 4 on a larger scale.

The filter spectacles 16 shown in cross section in FIG. 4 and partially in FIG. 5 are in the form of a dielectric interference line filter whose transmission corresponds to the emission lines described above, i.e., is mainly of the emission wave lengths $\lambda_1$, $\lambda_2$, $\lambda_3$ of the headlight 1.

As shown in FIG. 5, which is a section taken on the line V—V of FIG. 4, each glass of the filter spectacles 16 has a transparent glass plate 17 which serves as a substrate or support for the interference filter itself. This filter is composed of a transparent interference layer 18, having a thickness $d_z$ and a refractive index $n_z$ =1.3 and made, for example, of cryolite ($Na_3AlF_6$), and of similar reflection layer systems 19 to 25 and 26 to 32 arranged symmetrically on both sides of the layer 18. A transparent protection layer 33, for example, of $SiO_2$, is applied to the last reflection layer 32. The layers 19, 21, 23, 25 and 26, 28, 30, 32 have a high refractive index $n_H$ and are all made, for example, of $TiO_2$ or ZnS with a thickness of $d_r$, whereas the intermediate layers 20, 22, 24 and 27, 29, 31 have a lower refractive index $n_L$ and are all made, for example, of cryolite, $MgF_2$ or $SiO_2$, the thicknesses of the latter layers being indicated by $d_1$, $d_2$, $d_3$, respectively.

The thickness of the interference layer 18, which works in higher orders than the first one, may be ascertained by the following relation:

$$d_z = \lambda_i / 2n_z (M_i + \delta)$$

(1)

in which:

$\lambda_i$ = the transmitted wavelength;
$M_i$ = the interference orders corresponding to $\lambda_i$;
$\delta$ = the phase angle.

In the present case, which relates to transparent dielectrics, i.e., non-absorbent layers, the value of $\delta$ may be assumed to be about 0.5.

Thus, the interference layer 18 with a given thickness $d_z$ corresponds to the above relation (1) for the three transmission wave lengths $\lambda_1$, $\lambda_2$, $\lambda_3$ when:

$$\lambda_1 (M_1 + \delta) = \lambda_2 (M_2 + \delta) = \lambda_3 (M_3 + \delta) = \text{cost.} = d_z \cdot 2n_z$$

(2)

By repeated calculation using different orders $M_1$, $M_2$, $M_3$ a thickness $d_z$ of 2.17$\mu m$ may be ascertained in which the above condition (2) is met when:

$\lambda_3 = 592$ nm. with $M_1 = 9$
$\lambda_2 = 535$ nm. with $M_2 = 10$
$\lambda_1 = 450$ nm. with $M_3 = 12$.

Thus, the interference layer 18 of cryolite with a thickness of 2.17 $\mu m$ provides the three desired transmission wave lengths $\lambda_1$, $\lambda_2$, $\lambda_3$ corresponding to the three emission wave lengths of the headlights 1.

Evidently each of the reflection layers 19 to 25 and 26 to 32, taken alone, must permit a substantially uniform reflection and transmission at least over the entire spectral range $\lambda_1$ to $\lambda_3$. For this purpose the reflection ranges for the layers 20, 22, 24 and 27, 29, 31 with low refraction index $d_L$ may, for example, be displaced relative to one another, for instance, so that they will be located at $\lambda_o - 20$ (nm.), $\lambda_o$ and $\lambda_o + 20$ (nm.), $\lambda_o$ being a medium value for well visible light between 450 nm. and 630 nm. which value can be assumed to be 530 nm.

Thus, from the following known relations:

$d_1 = \lambda_o - 20/4_{n_L}$
$d_2 = \lambda_o/4_{n_L}$
$d_3 = \lambda_o + 20/4_{n_L}$, and
$d_r = \lambda_o/4_{n_H}$ the following layer thicknesses are obtained:
$d_1 = 98$ nm.; $d_2 = 102$ nm.; $d_3 = 106$ nm., and $d_r = 51$ nm.

To ensure that the filter spectacles will have a uniform spectral transmission factor irrespective of the direction of observation, i.e., for various directions of passage of the light, the interference layer thickness $d_z$ may be made so as to increase circularly and symmetrically from the axis of the spectacle glasses toward the edge of the spectacles.

FIG 4 shows the eye A of the driver at a distance $a$ from the filter spectacles 16, the angle of observation, i.e., the angle between the axis of the spectacles and any desired direction of observation through the spectacles being indicated by $\phi$ and the corresponding radius being indicated by $r$. So we have:

$\cos \phi = a \quad \sqrt{a^2 + r^2}$

The radial decrease of the layer thickness $d_z$ is ascertained by multiplying the same by the factor $\cos \phi/n_z$.

According to another modification of the first embodiment of the invention the gas discharge lamp of the headlight 1 or 35 may be a mercury vapor lamp with the following admixtures:

InI ($\lambda_1 = 451$ nm.), TlI ($\lambda_2 = 535$ nm.) and LiI ($\lambda_3 = 671$ nm.).

The dielectric interference line filter adapted thereto in this case is of a construction similar to that of FIG. 5, but with this construction the symmetrically arranged reflection layer systems and the interference layer produce another transmission effect. In this construction the reflection layer systems consist of a succession of layer materials having alternately a high and a low refractive index with a refractive index ratio $n_H/n_L = 1.33$ to 1.4. In this manner light is reflected in a range of 460 to 660 $n$ whereas outside this range almost all the light can pass. Thus, the emission lines of InI (450 nm.) and LiI (671 nm.) are transmitted and the transmission of the emission line of TlI (535 nm.) can be obtained, as described above, by appropriately selecting the interference layer.

In this manner the desired selective light transmission at $\lambda_1$, $\lambda_2$, $\lambda_3$ is obtained with an interference line filter of the first order which can easily be produced in a conventional way.

This interference filter of the first order also provides a particularly advantageous protection from dazzling by conventional sources of light with tungsten lamps whose light intensity relative to the spectral sensibility of the eye is located mainly in the reflection range of the filter.

As will be seen from the foregoing description, the anti-dazzle device essentially consists of a combination of a polychromatic linear irradiator with an interference line filter (spectacles 16). Thus, it is possible to utilize simultaneously several light wavelengths for illumination by appropriately adapting the thickness of the interference layer of the optical filter to the spectral lines emitted by the linear irradiator. The simultaneous use of different spectral colors, in the present case blue, green and orange (or red), permits the illuminated objects to appear in a substantially white light. Therefoe, the aforedescribed embodiment and the two modifications thereof not only provide protection from dazzling by conventional light sources with continuous irradiation but also a correct identification of the colours of the irradiated objects and other light sources. This is important for recognizing traffic signs, vehicle lights (e.g., stop and rear lights) and traffic-lights at street crossings.

In addition to the aforementioned admixtures InI, TlI, TlI and MaI (or LiI) various other materials may be used. Thus, for example, the alkaline earth metals Ca, Sr, Ba as well as the transition metals of the classes 2d, 3d and 4d of the Periodic System such as Sc, Cr, Ti, V and Nb may be advantageously used as admixtures for the gas discharge lamp of the polychromatic linear irradiator. Further, admixtures of rare earths such as Sm, Ce, Eu, Gd, La, Lu, Nd and Pr have advantageous properties for illumination purposes. By using the iodides (or bromides or tellurides) of the said elements in all cases an exothermic transport reaction may be maintained which causes the respective elements to be conveyed into the central gas discharge range.

Further, if desired, the useful light output of the gas discharge lamp may be increased in a known manner by continuous pulsing operation of the lamp.

Figure 6:
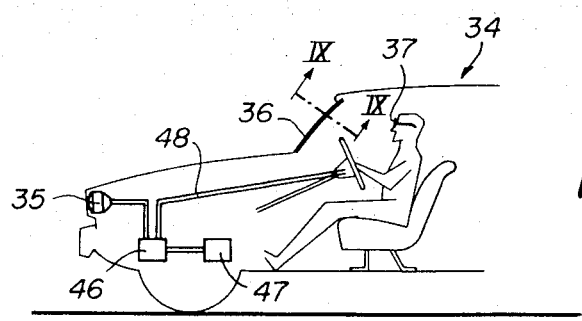
FIG. 6 is a schematic view of the second embodiment.

FIG. 6 schematically shows the components of the devices according to the second embodiment thereof. In this embodiment the device comprises, on the one hand, a pair of headlights 35 mounted on a motor vehicle 34 in a conventional manner and, on the other hand, a particular wind-screen 36 on the motor vehicle 34 and further the driver thereof is equipped with a pair of filter spectacles 37.

Figure 7:
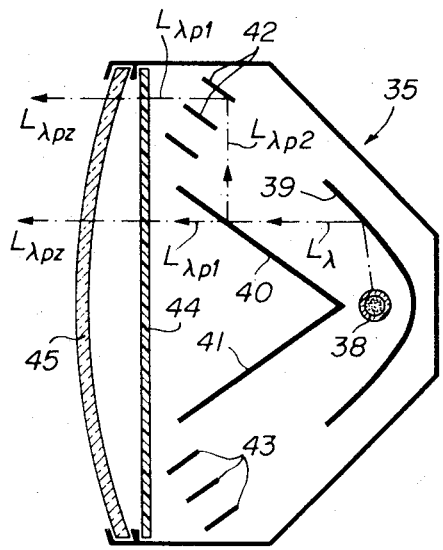
FIGS. 7 and 8 are detail views of FIG. 6 on a larger scale.
Figure 8:
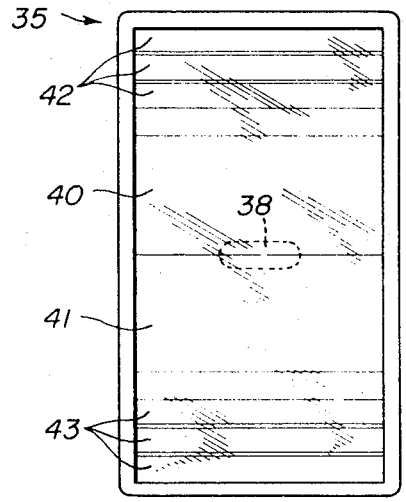

FIG. 7 shows a headlight 35 in schematic cross section. The light source of the headlight 35 is a gas discharge lamp 38 of the same type as described above with reference to the first embodiment, that is to say, the lamp 38 provides the same selective light emission at the said wave lengths $\lambda_1$, $\lambda_2$, $\lambda_3$ (blue, green, orange). The headlight 35 further has a parabolic reflector 39 (see FIG. 7) as well as a pair of Brewster angle polarizers 40 and 41, a pair of phase shifter mirrors 42 and 43 providing a total phase shifting of $\lambda b /2$, and a circular polarizer 44 in the form of a $\lambda/4$ foil.

As shown in FIG. 7, the two Brewster angle polarizers 40 and 41 are arranged symmetrically to the axis of the reflector 39. The elementary bundles of light L $\lambda$ projected forwardly from the reflector 39 are split up by the polarizers 40 and 41 into two polarized linear light bundles L $\lambda_{p1}$ and L $\lambda_{p2}$ whose planes of polarization are located perpendicularly to each other. The vertically extending light bundles L $\lambda_{p2}$ are deflected by the mirrors 42 and 43 into forwardly directed light bundles and simultaneously their polarization plane is turned through 90° by a $\lambda/4$ phase foil so that these light bundles are identical with the light bundles L $\lambda_{p1}$ directed forwardly by the polarizers 40 and 41. These polarized linear light bundles L $\lambda_{p1}$ reach the $\lambda/4$ foil 44 whose optical axis is located at an angle of 45° to the polarization plane of these bundles L $\lambda_{p1}$ which on passing through the $\lambda/4$ foil 44 are transformed into a light bundle L $\lambda_{pz}$ formed on light polarized circularly in a given direction of rotation.

As also shown in FIG. 7, a diffusion glass 45 is provided on the front side of the headlight 35. This diffussion glass may be of the conventional type, but in the present case may not have a double refraction and therefore must be made of glass free of stress. The diffusion glass 45, however, does not form an essential part of the device.

As shown in FIG. 6, the gas discharge lamp 38 of the headlight 35 is fed through a combined feeding and ignition device 46 by a storage battery 47 of the motor vehicle. The feeding and ignition device 46 is connected through a conductor 48 to a switch (not shown).

Figure 9:
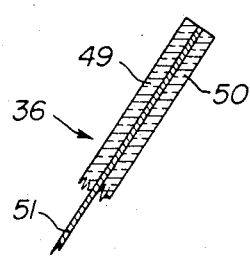
FIG. 9 shows a further detail of FIG. 6 on a larger scale.

The special wind-screen 36 shown partially in cross section in FIG. 9 is formed of two curved stress-free glass plates 49 and 50 between which an analyzer in the form of a circularly polarizing foil 51 is provided. The foil 51 is so arranged that it can be penetrated only by light which is circularly polarized in a direction of rotation opposed to the light bundles L $_{pz}$ emitted by the headlight 35. The foil 51 may be composed, for example, of a $\lambda/4$ retarder foil and a linearly polarizing foil. The analyzer foil 51 may also be, for example, a commercial polarizer foil of the type HNCP 37 produced by the Polaroid AG. company in Germany.

If required, the inner glass plate 50 of the wind-screen 36 may be coated with a layer (not shown) reflecting the thermal infrared radiation to protect the analyser foil 51 from undesired overheating due to a hothouse effect which may occur in the vehicle.

The filter spectacles 37 for the driver of the vehicle equipped with the above described headlights 35 and the wind-screeen 36 may be of the same construction as that described with reference to the first embodiment shown in FIGS. 4 and 5, as they serve the same purpose, i.e., they must allow the passage of the said same three wave lengths $\lambda_1$, $\lambda_2$, $\lambda_3$, so that practically all the light of the vehicle's own headlights 35 may pass through the wind-screen 36 to the driver. The light from other sources, for example, from conventional headlights, particularly also such having no polarization devices, on the contrary, is permitted to pass only to a very small extent.

Moreover, conventional non-polarized light sources as well as the objects illuminated thereby are already attenuated by the special wind-screen 36 to about 35 to 40 percent of their origiqal brightness.

On the other hand, depolarized light coming from the headlights 35 and formed, for example, by diffuse back dissipation on illuminated objects on the travelling path, to a substantial portion (up to 80 percent) passes through the special wind-screen 36. This permits the driver to clearly recognize objects on the travelling path illuminated by the headlights of his vehicle irrespective of whether these objects are illuminated by his own headlights or headlights of the same type mounted on other vehicles.

Thus, the driver always has the impression that the road is illuminated by his own headlights or other similar headlights even when there are also other sources of light.

The described device provides an illumination of the travelling path of the vehicle equipped therewith, which is both efficient and true to color, and simultaneously ensures an efficient protection of the driver from dazzling since the filter spectacles 37 attenuate outer light sources of the usual kind and the wind-screen 36 is largely impenetrable by polarized light of similarly equipped vehicles travelling in the opposite direction.

The described headlights 35 have the same power consumption and illuminate the travelling path with about the same brightness as the best conventional headlights having W-halogen incandescent lamps. The said three spectral colours provide an almost white light which is similar to daylight and reproduces correctly all colour shades with the exception of dark red which appears as cinnabar red.

The wind-screen 36 in combination with the filter spectacles 37 provides an attenuation approximately by the factor 10 of the light that reaches the driver from conventional non-polarizing headlights, stationary lights and light reflexes of various kinds. Further, traffic-lights as well as stop and rear lights of other vehicles are likewise attenuated but appear in the correct colour. These lights can be safely recognized also in daylight when ambient illumination is about 100 to 1000 times as bright and therefore their recognition is always ensured with the use of the wind-screen 36 and the filter spectacles 37 but at night the unpleasant and dangerous dazzling of the driver is largely eliminated.

The second embodiment of the described device according to FIGS. 6 to 9 affords the possibility of a prolonged period of introduction in which all motor vehicles can be progressively equipped with such a device. In fact, such a combined device provides efficient protection from dazzling by vehicles equipped in the conventional manner as well as vehicles equipped with the same device, at any time during the introduction period and thereafter.

When going abroad with a motor vehicle into countries where no protection from dazzling by polarization devices has been generally adopted, with vehicles equipped with the described device according to the third embodiment likewise an efficient protection from dazzling is obtained contrary to the polarization anti-dazzle devices hitherto proposed.

The use of a gas discharge lamp as a light source permits the inevitable loss of light caused by the use of polarization filters to be largely compensated since the useful light output of a gas discharge lamp is substantially higher than that of the hitherto used incandescent lamps. In this manner a sufficient illumination of the travelling path of the vehicle is ensured with the same power consumption.

Although some preferred embodiments of the invention have been described and illustrated herein in detail, it is to be understood that the invention is not limited to these precise embodiments and that various changes and modifications, in addition to those already described, may be made therein without departing from the scope of the invention.

We claim:

1. A device for illuminating the travelling path of a vehicle and protecting the driver from dazzling by opposed sources of light, comprising at least one headlight having a source of light in the form of a linear irradiator whose light emission is mainly limited to certain spectral lines distributed over the visible range, and an optical filter adapted to the light emission of the linear irradiator and arranged between the travelling path of the vehicle and the driver thereof, said optical filter being penetrable by the light coming from said headlight and being impenetrable by the light of other wavelength, said optical filter being an interference filter having a maximum transmission in the order 9 at a wavelength of about 592 nm., and in the order 12 at a wave length of about 450 nm.

2. A device as defined in claim 1, wherein said source of light of the headlight is a gas discharge lamp.

3. A device as defined in claim 1, wherein said source of light of the headlight is a Hg vapor lamp.

4. A device as defined in claim 1, wherein said source of light of the headlight is a Hg vapor lamp containing an admixture of at least two metal halides irradiating light in at least two spectral lines in the visible range.

5. A device as defined in claim 1, wherein said source of light of the headlight is a Hg vapor lamp containing an admixture of at least two metal halides selected from the group consisting of InI, TlI and NaI.

6. A device as defined in claim 1, wherein said optical filter is in the form of spectacles adapted to be worn by the driver.

7. A device as defined in claim 1, wherein said optical filter is arranged in a position in front of the driver of the vehicle so as to be tilted out of the way.

8. A device as defined in claim 1, wherein said headlight has a polarizer for irradiating light with a certain condition of polarization and said optical filter is a polarization filter arranged in front of the position of the driver on the vehicle and penetrable by incident light having a polarization condition opposed to that of the light irradiated by the headlight.

9. A device as defined in claim 1, wherein said optical filter includes a polarization filter secured to a wind-screen of the vehicle.

10. A device as defined in claim 1, wherein said optical filter is an interference filter having two dielectric reflection layer systems.

11. A device as defined in claim 1, wherein said optical filter is an interference filter having two dielectric reflection layer systems each having a plurality of individual layers of different refractive indices and thicknesses.

12. A device as defined in claim 1, wherein said headlight is provided with means for forming bundles of light and said gas discharge lamp is arranged for vertically shifting movement relative to said light bundle forming means to permit said headlight to be switched over from a country beam to a traffic beam and vice versa.

13. A device as defined in claim 1, wherein said optical filter is an interference filter having an interference layer of a thickness proportional to $\cos \phi/n$ with different angles of vision $\phi n$ representing the refractive index of the material of said interference layer.

14. A system for illuminating the path of a vehicle, comprising:

light-projecting means on said vehicle including a linear radiator for training a beam of light having three discrete spectral lines corresponding to different distinct colors spaced apart in the visible spectrum and providing a polychromatic ilumination of said path similar to the effect of white light; and viewing filter means interposable between the eyes of the vehicle operator and said path and including a polychromatic line filter passing substantially only said spectral lines while screening at least a major part of intercepted light elsewhere along the visible light spectrum whereby the vehicle operator is afforded correct recognition of objects along said path illuminated by said beam without substantial loss of contrast.

15. The system defined in claim 14 wherein said linear radiator is a mercury vapor lamp containing at least three metal halides generating light of said three spectral lines.

16. The system defined in claim 15 wherein said mercury vapor lamp contains InI, TlI and NaI as said halides.

17. The system defined in claim 14 wherein said polychromatic line filter is an interference filter comprising two dielectric reflection layer systems each having a plurality of individual layers of different refractive indices and thicknesses, said interference filter having transmission wavelengths corresponding to said spectral lines.

18. The system defined in claim 14 wherein said polychromatic line filter is an interference filter having a maximum transmittance of the order of 9 at a wavelength of about 592 nm, of the order of 10 at a wavelength of about 535 nm and of the order of 12 at a wavelength of about 450 nm.

19. The system defined in claim 14 wherein said light-projecting means further includes polarizing means for imparting to said polychromatic illumination a given selected state of polarization; and said viewing filter means includes a polarization filter disposed to pass light substantially only of said given selected state of polarization from objects reflecting same and to reject substantially all light from oncoming vehicles provided with similar projecting means and with tungsten headlamps.

* * * * *